(12) United States Patent
Arunkumar et al.

(10) Patent No.: US 10,740,785 B2
(45) Date of Patent: Aug. 11, 2020

(54) SPLITTING AND MERGING ADVERTISEMENTS TO A PLURALITY OF DEVICES

(71) Applicant: International Business Machines Corporation, Armonk, NY (US)

(72) Inventors: Saritha Arunkumar, Basingstoke (GB); Kuntal Dey, New Delhi (IN); Nizar Lethif, Croton-on-Hudson, NY (US); Enara C. Vijil, Croton on Hudson, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/357,738

(22) Filed: Mar. 19, 2019

(65) Prior Publication Data

US 2019/0213628 A1    Jul. 11, 2019

Related U.S. Application Data (63) Continuation of application No. 15/196,123, filed on Jun. 29, 2016, now Pat. No. 10,346,872.

(51) Int. Cl.
| | |
|---|---|
| *G06Q 30/02* | (2012.01) |
| *H04W 4/02* | (2018.01) |
| *H04W 4/08* | (2009.01) |
| *H04W 4/23* | (2018.01) |
| *H04W 4/029* | (2018.01) |
| *H04L 29/08* | (2006.01) |
| *H04L 29/06* | (2006.01) |

(52) U.S. Cl.
CPC ..... *G06Q 30/0244* (2013.01); *G06Q 30/0269* (2013.01); *H04W 4/023* (2013.01); *H04W 4/029* (2018.02); *H04W 4/08* (2013.01); *H04W 4/23* (2018.02); *H04L 65/60* (2013.01); *H04L 67/306* (2013.01)

(58) Field of Classification Search
CPC .................................................. G06Q 30/02
See application file for complete search history.

(56) References Cited

U.S. PATENT DOCUMENTS

| | | | | |
|---|---|---|---|---|
| 8,484,676 | B1 * | 7/2013 | Narsimhan | H04N 21/4126 348/734 |
| 2016/0127775 | A1 | 5/2016 | Zilberstein et al. | |
| 2016/0249085 | A1 * | 8/2016 | Ben-Atiya | H04N 21/2547 |
| 2016/0253710 | A1 | 9/2016 | Publicover et al. | |

OTHER PUBLICATIONS

Mel, et al. "The NIST Definition of Cloud Computing". Recommendations of the National Institute of Standards and Technology. Nov. 16, 2015.

United States Notice of Allowance dated Feb. 26, 2019, in U.S. Appl. No. 15/196,123.

\* cited by examiner

*Primary Examiner* — Marilyn G Macasiano
(74) *Attorney, Agent, or Firm* — Anthony R. Curro, Esq.; McGinn IP Law Group, PLLC (57) ABSTRACT

A split and merge advertisement method, system, and non-transitory computer readable medium, include splitting a first advertisement to be played on a second device when a moving user of a first group of users moves from a proximity of a first device to a proximity of the second device.

6 Claims, 7 Drawing Sheets

SPLITTING AND MERGING ADVERTISEMENTS TO A PLURALITY OF DEVICES

CROSS-REFERENCE TO RELATED APPLICATIONS

The present application is a Continuation Application of U.S. patent application Ser. No. 15/196,123, filed on Jun. 29, 2016, the entire contents of which are hereby incorporated by reference.

BACKGROUND

The present invention relates generally to a split and merge advertisement system, and more particularly, but not by way of limitation, to a split and merge advertisement system for splitting advertisements to other devices as users physically move between devices, and, then merging the advertisements back together as the users physically move back to previous devices that are currently displaying other advertisements to users.

Conventional advertisement techniques consider adapting advertisements to maximize the satisfaction of subgroups of a group viewing advertisements (e.g., personalization techniques). However, the conventional optimization techniques only consider a single device.

Other conventional techniques have considered cross-channel and cross-device remarketing from advertisements previously generated and advertised to the user.

However, there is a technical problem in the conventional techniques in that the conventional techniques do not consider splitting advertisements to different devices as a group of users splits into subgroups of users at different devices, and then merging different advertisements together as the subgroups reform the group (or form a new group) at the prior device to optimally advertise to dynamically changing groups or subgroups of users.

SUMMARY

In view of the technical problem, the inventors have considered a non-abstract improvement to a computer technology via a technical solution to the technical problem in which advertisements can be moved between devices as users move between devices such that when a group of users splits up into multiple groups and physically move in front of different devices, the advertisement is split to play on the different device from the middle of the advertisement, and as the users move back to a prior device (or a different device), the advertisements from the two separate devices can be merged together at locations where other users are already watching a different advertisement on the other devices.

In an exemplary embodiment, the present invention can provide a split and merge advertisement system interfacing with a plurality of devices, each device including a user identifying unit configured to identify each user viewing advertisements on the respective device, the system including a device data collecting circuit configured to collect data from a first device indicating a first group of users are viewing a first advertisement on the first device, an advertisement splitting circuit configured to split the first advertisement to be played on a second device when a moving user of the first group of users moves from a proximity of the first device to a proximity of the second device as detected by the user identifying unit of each of the first device and the second device, an optimization circuit configured to optimize a second advertisement to be played on the first device for the first group of users having a new group composition and a third advertisement to be played on the second device for the moving user, and an advertisement merging circuit configured to merge the third advertisement with the second advertisement when the moving user moves from the second device to the first device.

Further, in another exemplary embodiment, the present invention can provide a split and merge advertisement method interfacing with a plurality of devices, each device including a user identifying unit configured to identify each user viewing advertisements on the respective device, the method including collecting data from a first device indicating a first group of users are viewing a first advertisement on the first device, splitting the first advertisement to be played on a second device when a moving user of the first group of users moves from a proximity of the first device to a proximity of the second device as detected by the user identifying unit of each of the first device and the second device, optimizing a second advertisement to be played on the first device for the first group of users having a new group composition and a third advertisement to be played on the second device for the moving user, and merging the third advertisement with the second advertisement when the moving user moves from the second device to the first device.

Even further, in another exemplary embodiment, the present invention can provide a non-transitory computer-readable recording medium recording a split and merge advertisement program interfacing with a plurality of devices, each device including a user identifying unit configured to identify each user viewing advertisements on the respective device, the program causing a computer to perform: collecting data from a first device indicating a first group of users are viewing a first advertisement on the first device, splitting the first advertisement to be played on a second device when a moving user of the first group of users moves from a proximity of the first device to a proximity of the second device as detected by the user identifying unit of each of the first device and the second device, optimizing a second advertisement to be played on the first device for the first group of users having a new group composition and a third advertisement to be played on the second device for the moving user, and merging the third advertisement with the second advertisement when the moving user moves from the second device to the first device.

There has thus been outlined, rather broadly, an embodiment of the invention in order that the detailed description thereof herein may be better understood, and in order that the present contribution to the art may be better appreciated. There are, of course, additional exemplary embodiments of the invention that will be described below and which will form the subject matter of the claims appended hereto.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The exemplary aspects of the invention will be better understood from the following detailed description of the exemplary embodiments of the invention with reference to the drawings.

DETAILED DESCRIPTION OF THE EXEMPLARY EMBODIMENTS

The invention will now be described with reference to FIGS. 1-7, in which like reference numerals refer to like parts throughout. It is emphasized that, according to common practice, the various features of the drawing are not necessarily to scale. On the contrary, the dimensions of the various features can be arbitrarily expanded or reduced for clarity. Exemplary embodiments are provided below for illustration purposes and do not limit the claims.

Figure 1:
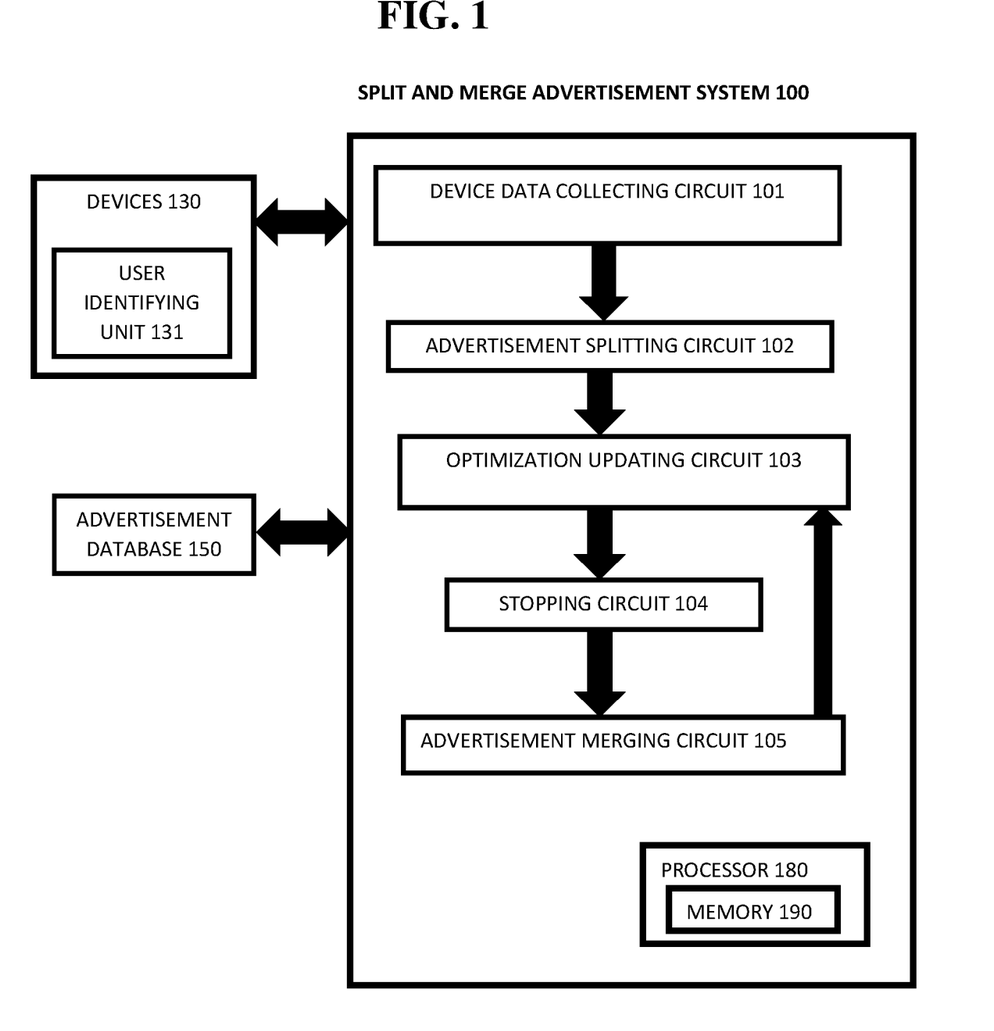
FIG. 1 exemplarily shows a block diagram illustrating a configuration of a split and merge advertisement system 100.

With reference now to FIG. 1, the split and merge advertisement system 100 includes a device data collecting circuit 101, an advertisement splitting circuit 102, an optimization updating circuit 103, a stopping circuit 104, and an advertisement merging circuit 105. The split and merge advertisement system 100 includes a processor 180 and a memory 190, with the memory 190 storing instructions to cause the processor 180 to execute each circuit of split and merge advertisement system 100. The processor and memory may be physical hardware components, or a combination of hardware and software components.

Although the split and merge advertisement system 100 includes various circuits, it should be noted that the split and merge advertisement system can include modules in which the memory 190 stores instructions to cause the processor 180 to execute each module of split and merge advertisement system 100.

Also, each circuit can be a stand-alone device, unit, module, etc. that can be interconnected to cooperatively produce a transformation to a result.

With the use of these various circuits, the split and merge advertisement system 100 may act in a more sophisticated and useful fashion, and in a cognitive manner while giving the impression of mental abilities and processes related to knowledge, attention, memory, judgment and evaluation, reasoning, and advanced computation. That is, a system is said to be "cognitive" if it possesses macro-scale properties—perception, goal-oriented behavior, learning/memory and action—that characterize systems (i.e., humans) that all agree are cognitive.

Figure 5:
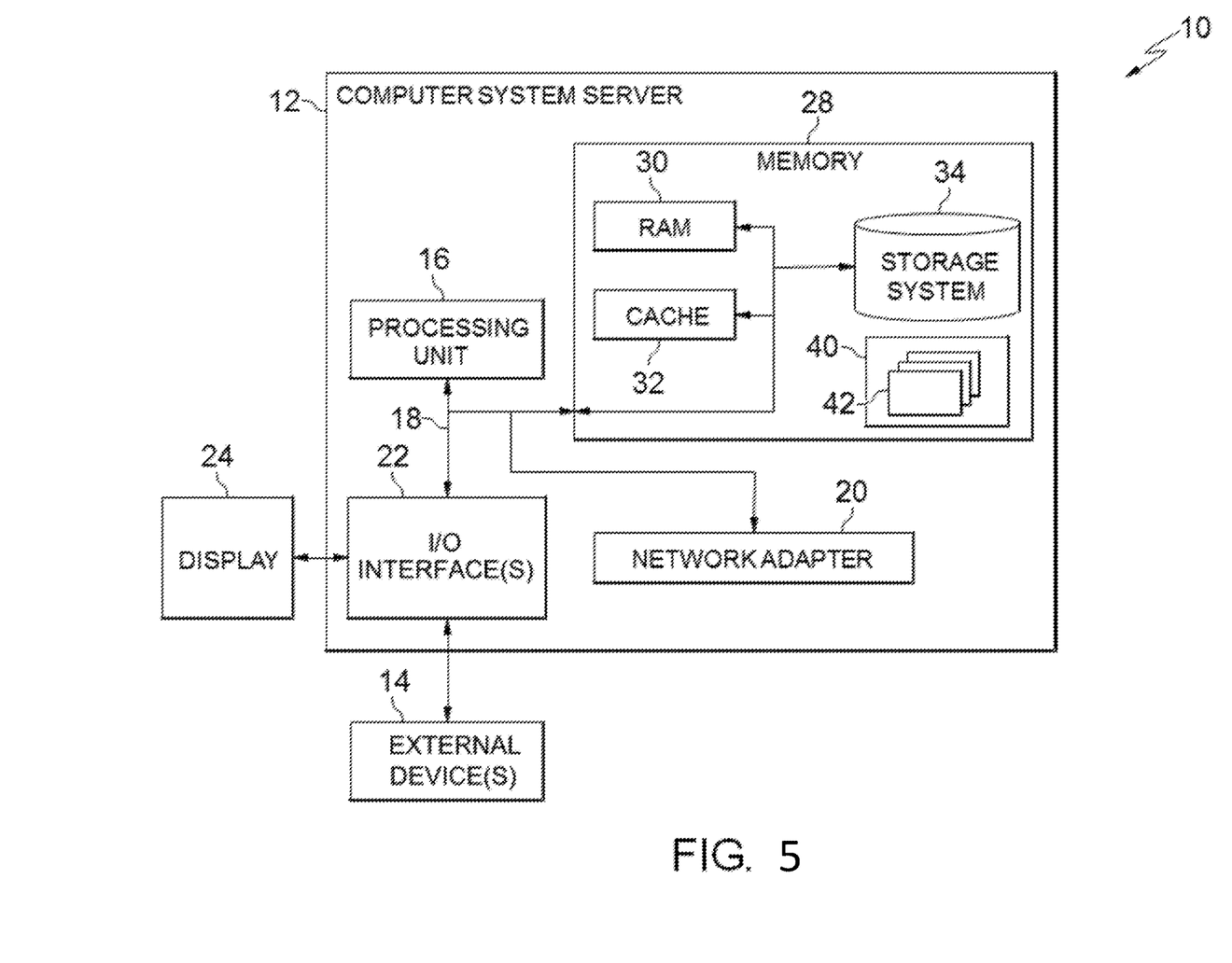
FIG. 5 depicts a cloud computing node 10 according to an exemplary embodiment of the present invention.
Figure 6:
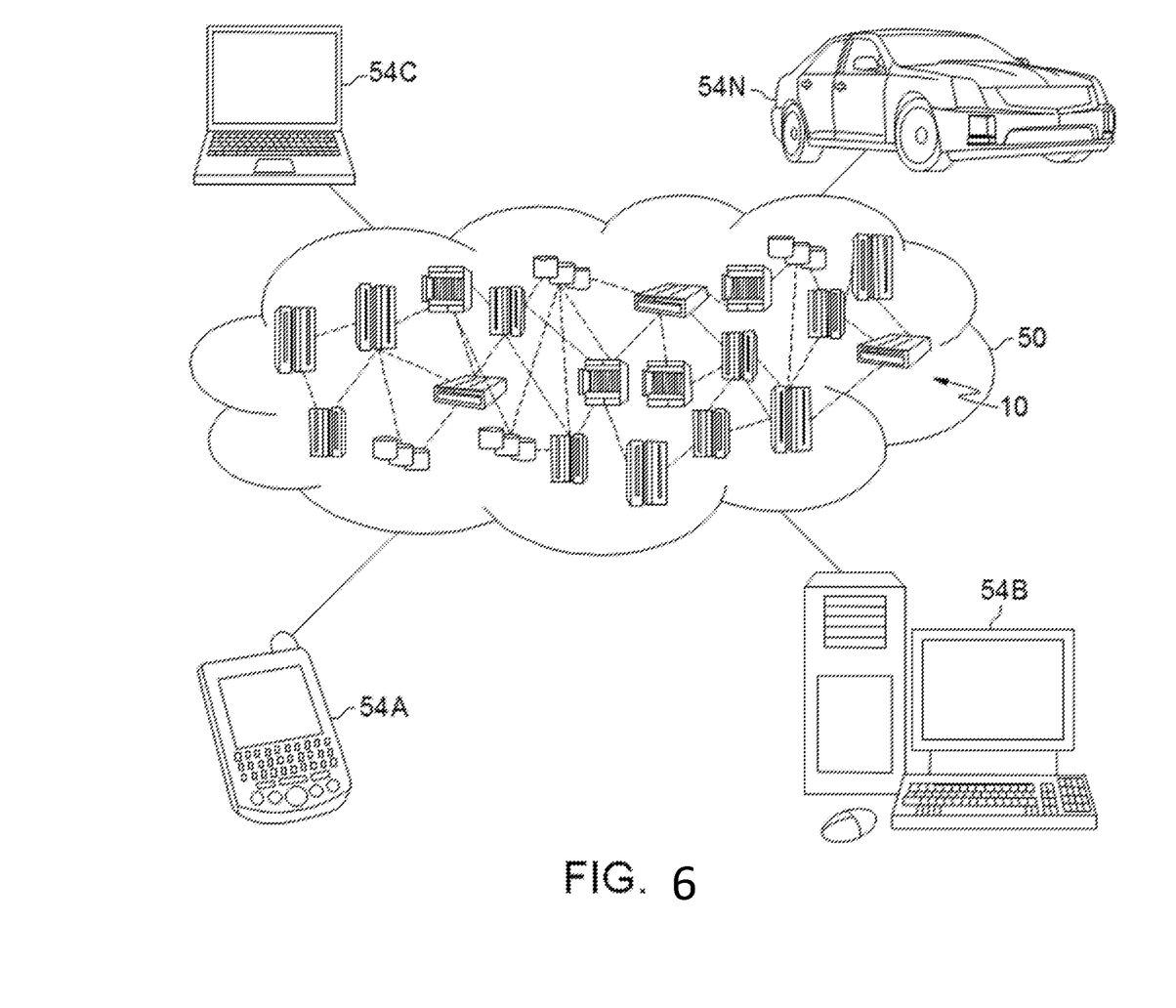
FIG. 6 depicts a cloud computing environment 50 according to another exemplary embodiment of the present invention.
Figure 7:
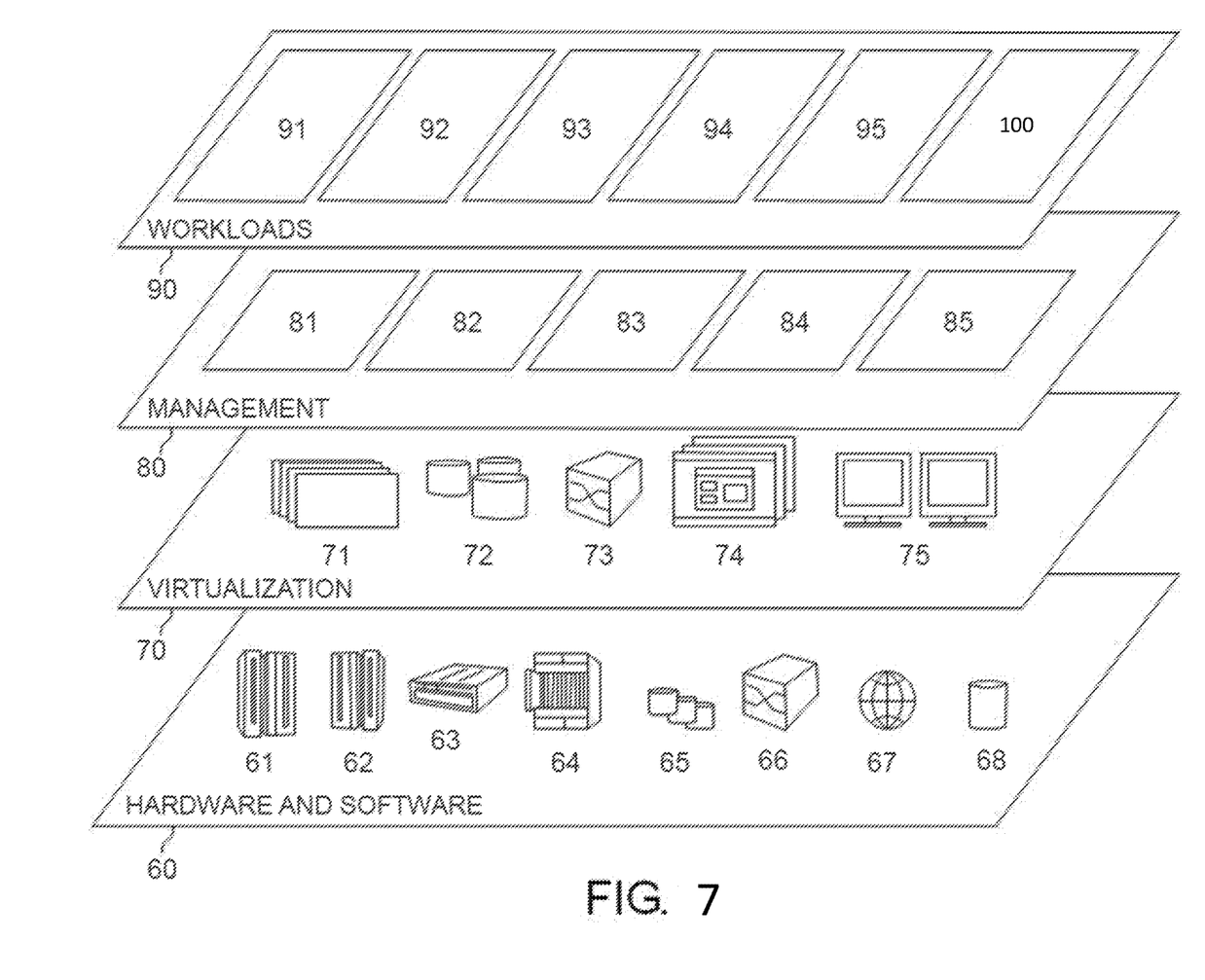
FIG. 7 depicts abstraction model layers according to an exemplary embodiment of the present invention.

Although as shown in FIGS. 5-7 and as described later, the computer system/server 12 is exemplarily shown in cloud computing node 10 as a general-purpose computing circuit which may execute in a layer the split and merge advertisement system 100 (FIG. 6), it is noted that the present invention can be implemented outside of the cloud environment.

Devices 130 serve advertisement(s) from the advertisement database 150 for a user to view. The devices 130 can include a television, mobile device, a billboard, a banner, a ticker, a business location, or any medium(s) that can display an advertisement.

Each of the devices 130 includes a user identifying unit 131 for identifying the users who are viewing the device 130. That is, the user identifying unit 131 identifies the user(s) who are currently viewing an advertisement on the device 130 and identifies when the user(s) viewing the device 130 change such as when a user leaves the presence of the device 130 or enters the presence of the device 130 (e.g., the group of users using the device 130 changes). The user identifying unit 131 also stores by which device a user was last identified, such that as a user moves between devices 130. Based on the user identifying unit 131 identifying certain user(s), the advertisement(s) are personalized for the individual user, or optimized to maximize the combined satisfaction of the group, where the group members have been identified.

The device data collecting circuit 101 collects the data from the devices 130 of which user(s) are currently viewing a first advertisement on a first device 130 of the devices 130 and when (e.g., at what point during the advertisement) a user, who was watching the first advertisement on the first device 130, moves to a second device 130 that is not displaying an advertisement, or to a third device 130 that is displaying a second advertisement to a different user(s).

In other words, the device data collecting circuit 101 tracks which advertisements the users are currently watching on a device 130 and which advertisement the user was previously watching when the user moves to a new (i.e., different) device 130.

Based on the point during the first advertisement that the user has been detected to have left the proximity of the first device 130, the advertisement splitting circuit 102 splits the first advertisement to be played on the second device 130 from the point the user left the viewing proximity of the first device 130. That is, in the event that one or more of the users move to one or more locations that are close to one or more other devices (e.g., the second device) recognized by the user identifying unit 131, the ongoing advertisement is also delivered onto the second device, adapting to the capabilities of the one or more other devices from the point at which the user left the proximity of the first device by the advertisement splitting circuit 102 (e.g., the first advertisement is split to a second device).

The optimization updating circuit 103 dynamically updates the optimization of the advertisements based on the device data collecting circuit 101 identifying that the users viewing the particular device 130 has changed. Thus, as a user(s) enter and leave the proximity of a device 130, the next (subsequent) advertisement played on the device 130 with the new user(s) will be optimized based on the detected change in user(s) viewing the device 130.

Also, the optimization updating circuit 103 re-computes the dynamic personalization of the advertisements when a split event, as now the device 130 needs to deliver to only a sub-group (e.g., changed group composition) of the originally computed group. Thereby, the optimization can be performed based on the detection of a new user (e.g., changed group composition) or based on a splitting of the advertisement onto a different device such that subsequent advertisements are optimized to the new user(s) (changed group composition) near the devices 130.

Further, when the advertisement splitting circuit 102 splits the advertisement, the optimization of advertisements by the optimization updating circuit 103 does not need necessarily to happen from the next advertisement onwards. In the case that on-the-fly modification of advertisements are possible (such as, when a series of videos are dynamically composed to generate an advertisement on the fly while the earlier part of the same (e.g., dynamically-generated-that-far) advertisement is being played), the ongoing split advertisement can be optimized with content "C1" for audience subset "A", and with content "C2" for audience subset "B" (assuming that the audience has split into two parts—"A" and "B").

The stopping circuit 104 stops the device 130 from distributing an advertisement if the device data collecting circuit 101 detects that there are no users in the proximity (e.g., close to) of the device 130. The proximity to the user can be set freely according to a user preference. For example, if adjacent rooms each have a device 130, the proximity can be set such that the user has to be within the room and such that the stopping circuit 104 can stop the device from playing an advertisement once the user(s) leaves the room.

When the device data collecting circuit 101 identifies that a user(s) has moved from a second device playing a second advertisement to a first device already playing a first advertisement to a user(s), the advertisement merging circuit 105 merges the first advertisement and the second advertisement using an in-advertisement dynamic personalization technique such that the two advertisements are merged to continue playing for the new set of users.

For example, the advertisement merging circuit 105 can merge the first and second advertisements together by setting the first advertisement as a first portion of the total advertisement and having a second portion (e.g., the portion of the advertisement after the merge) that comprises an optimization of the at least two merged advertisements, a pre-programmed segment based on types of advertisements being merged, etc. and the second portion needs to be filled in dynamically after the first portion of the advertisement.

For example, if the first advertisement is directed to a vacation on a beach and the second advertisement is direct to a soft drink, when the advertisements are merged together by the advertisement merging circuit 105, the later portion (e.g., the portion of the advertisement after the merging) can include a person on a beach drinking the soft drink such that the advertisements are "merged" together.

Further, after the advertisement merging circuit 105 merges the advertisements together based on the group composition changing (e.g., more (less) users), the optimization updating circuit 103 updates the advertisements based on the new group composition such that the most optimal advertisements are distributed to the users based on the new group composition in subsequent advertisements.

Also, on the merge, if there are any "subsequent advertisements" pre-computed for the user(s) to be shown after the current advertisement being played, then that pipeline of "subsequent advertisements" is cancelled by the advertisement merging circuit 105 when the advertisement merging circuit 105 merges a second advertisement with the first advertisement. When the "subsequent advertisements" are cancelled, the advertisement merging circuit 105 causes the optimization updating circuit 103 to re-compute a new set of "subsequent advertisements" to update the set of upcoming group-level-personalized ads. For example, if a user joins a group of users on the third minute of a five-minute break where five advertisements of one-minute duration each are identified and pre-computed (personalized for the earlier subgroup etc.), then the fourth and fourth minute ads that were earlier made ready, will be cancelled, and new advertisements (with new personalization's that also count the new users presence) will be used as replacement for the remainder of the segments (i.e., the fourth and fifth advertisements).

Thereby, the system 100 performs a split-merge process of advertisements from one up to many devices or from many devices down to one (and all the intermediate numbers between 1 and many) number of devices, adapting for the different modalities supported by those devices as far as content delivery modality (e.g., audio, video etc.), by dynamically invoking advertisement optimization methods for such different users/subgroups of identified users at multiple different times as and when detected necessary.

Figure 4A:
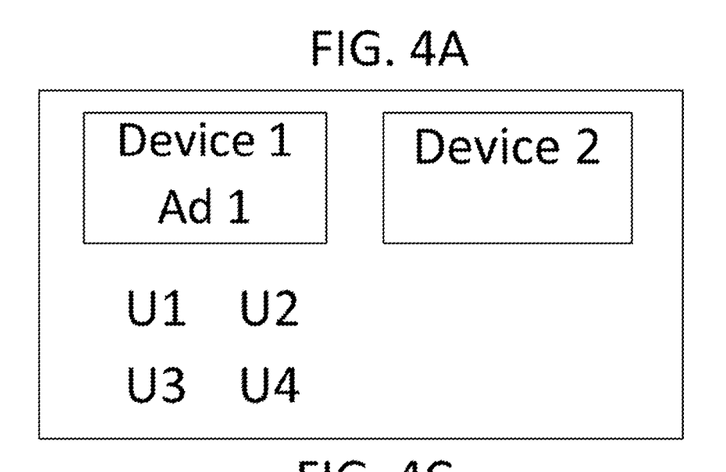
FIGS. 4A-D exemplarily depicts splitting and merging of advertisements as facilitated by the split and merge advertisement system 100.
Figure 4B:
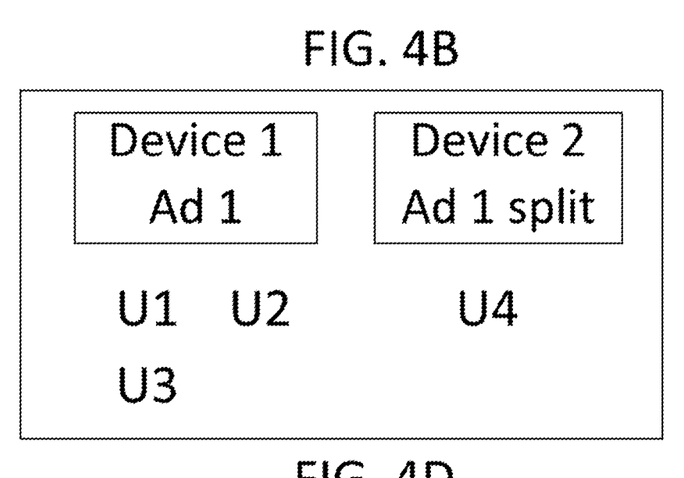

Referring to FIG. 4A, Device 1 and Device 2 are devices 130 including a user identifying unit 131. The device data collecting circuit 101 collects the device data from Device 1 and Device 2 indicating that a first group of users ("U1", "U2", "U3", "U4") are viewing "Ad 1" on Device 1 and no users are in the proximity of Device 2. As shown in FIG. 4B, user "U4" moves from Device 1 to Device 2 as detected by the user identifying unit 131 of each device, and the advertisement splitting circuit 102 causes "Ad 1" to split from Device 1 to Device 2 which starts playing on Device 2 from a time that "U4" left Device 1. That is, the device data collecting circuit 101 receives the data from Device 1 and Device 2 indicating that the first group now includes a new group composition of users "U1", "U2", and "U3" and Device 2 has a second group of user "U4".

Figure 4C:
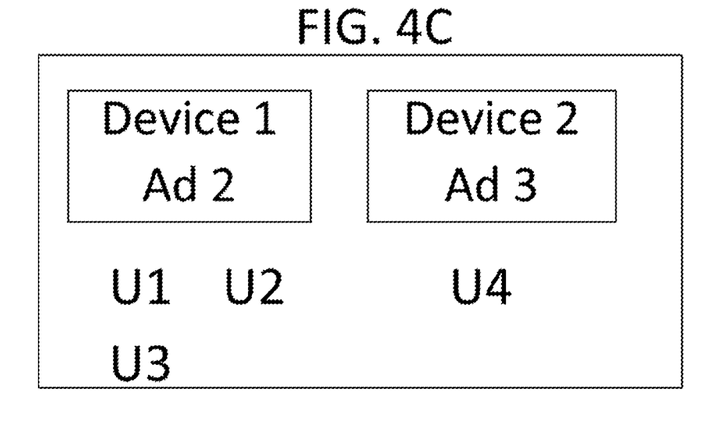

As shown in FIG. 4C, because the advertisement splitting circuit 102 split the "Ad 1" to Device 2 and the group composition of the groups changes, the optimization updating circuit 103 updates the advertisement optimization such that subsequent advertisements on Device 1 and Device 2 are optimized for the new group compositions. Thus, the optimization updating circuit 103 determines that "Ad 2" is optimal for the first group of users "U1", "U2", and "U3" and "Ad 3" is optimal for the second group of user "U4".

Figure 4D:
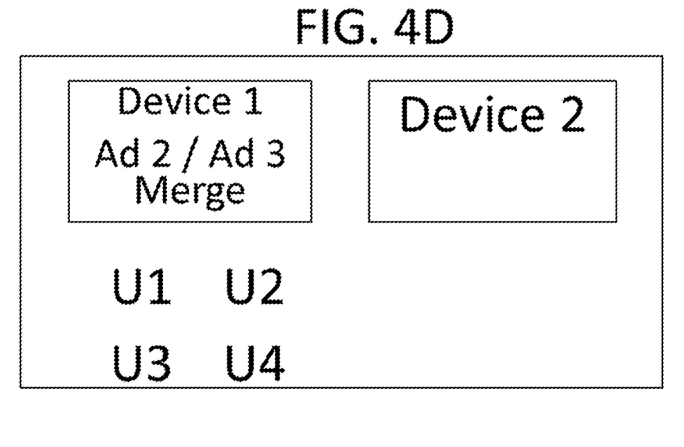

As shown in FIG. 4D, user "U4" decides to move back to Device 1 while "Ad 3" is playing and thus the stopping circuit 104 stops "Ad 3" from being played on Device 2 and the advertisement merging circuit 105 performs an in-advertisement dynamical update to merge "Ad 2" and "Ad 3" together.

Figure 3:
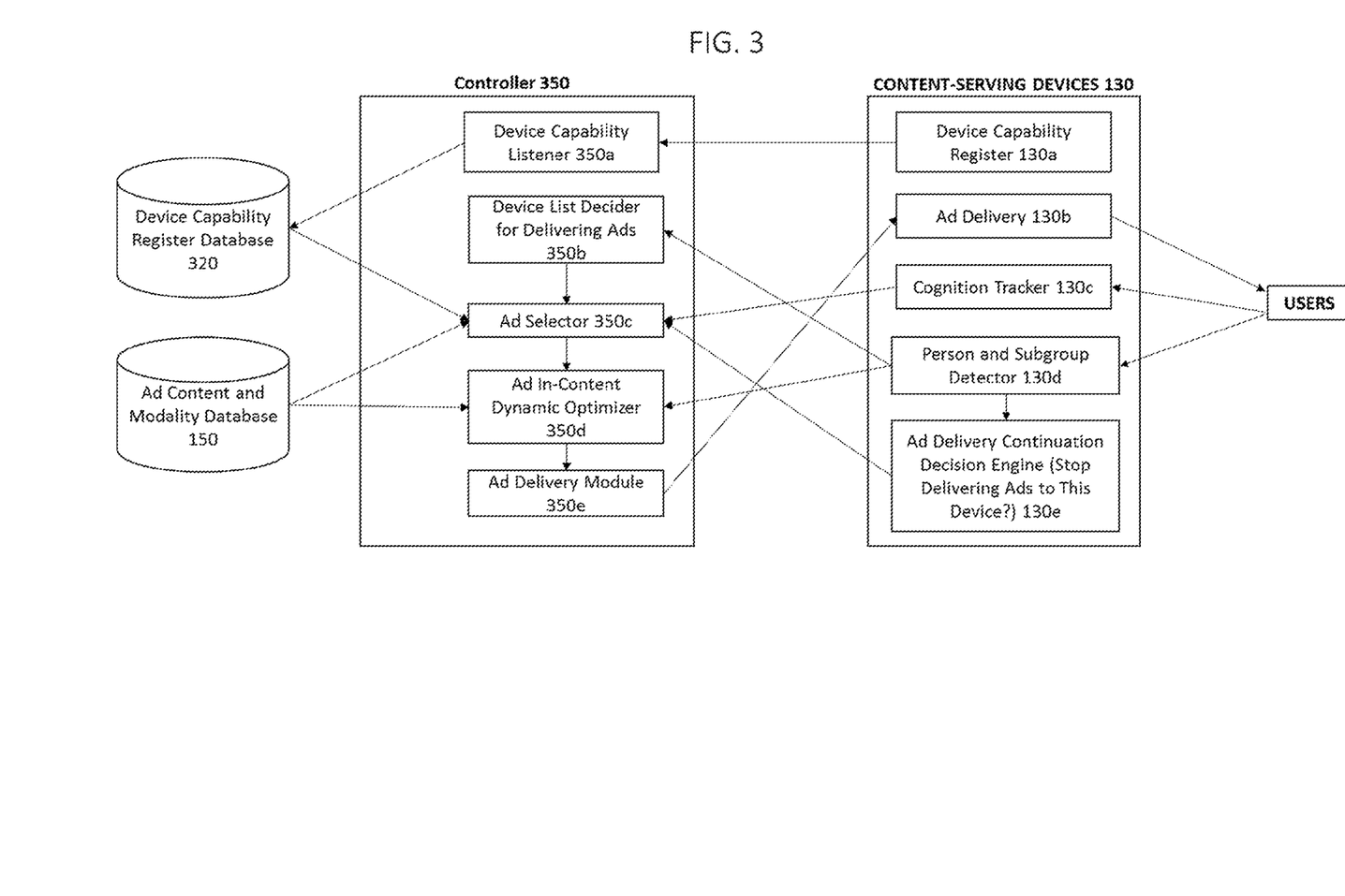
FIG. 3 exemplarily shows an exemplary splitting and merging of advertisements between a controller 350, content-serving devices 130, a device capability register database 320, and an ad content and modality database 150 as facilitated by the split and merge advertisement system 100.

FIG. 3 shows an exemplary embodiment of the system 100 facilitating splitting and merging of advertisements between content-serving devices 130.

The device capability listener 350a (e.g., embodied as previously described device data collecting circuit 101) collects data from devices 130 including the advertising capabilities from the device capability register 130a (e.g., audio, video, audio/video advertisements) based on data in the device capability register database 320.

Further, the device list decider for delivering ads 350b (e.g., embodied as previously described device data collecting circuit 101) receives which users and when users are in the proximity of devices 130 from the person and subgroup detector 130*d* (e.g., embodied as previously described user identifying unit 131). The ad delivery 130*b* shows an advertisement on the devices 130 and the cognition tracker 130*c* tracks data of the users such that the ad selector 350*c* (e.g., embodied as previously described optimization updating circuit 103) can optimize which advertisements to deliver from the ad content and modality database 150 (e.g., embodied as previously described the advertisement database 150).

As the person and subgroup detector 130*d* detects a change in group composition or a user coming to the proximity of a device 130 that no advertisement is being played on, the ad selector 350*c* (e.g., embodied as previously described the advertisement splitting circuit 102) causes the ad delivery 130*b* to deliver a split version of the advertisement. When the person and subgroup detector 130*d* detects that a user has joined a group viewing an advertisement from a prior device viewing a different advertisement, the ad in-content dynamic optimizer 350*d* (e.g., embodied as previously described advertisement merging circuit 105) merges the two advertisements together and the ad delivery module 350*e* delivers the merged advertisement via the ad delivery 130*b* of the device 130. Also, the ad delivery continuation decision engine 130*e* (e.g., embodied as previously described stopping circuit 104) stops advertisements from being delivered when the person and subgroup detector 130*d* detects that no user in near the proximity of the device 130.

Figure 2:
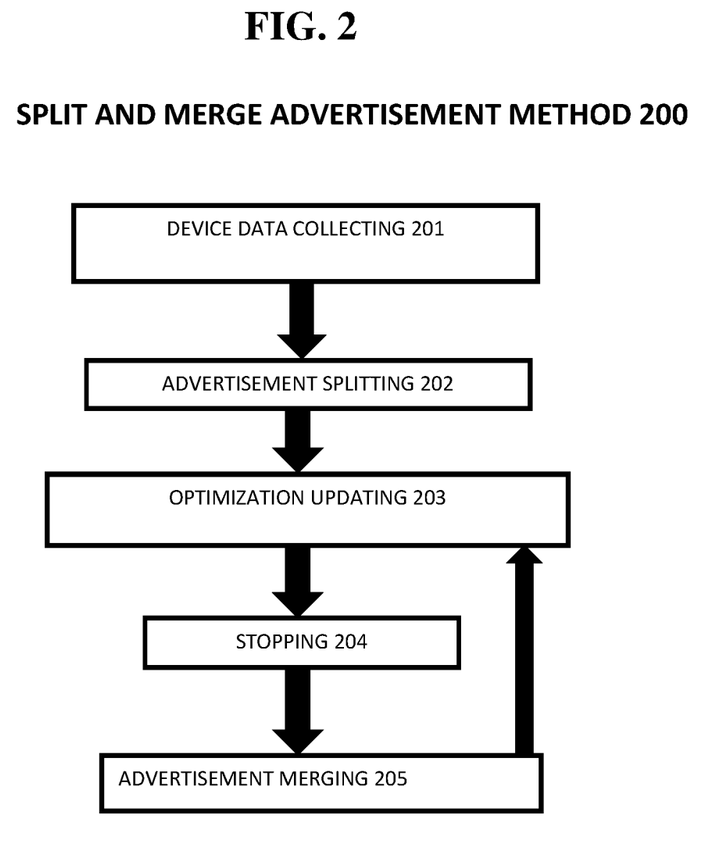
FIG. 2 exemplarily shows a high level flow chart for a split and merge advertisement method 200.

FIG. 2 shows a high level flow chart for a method 200 of split and merge advertisement.

Step 201 collects the data from the devices 130 of which user(s) are currently viewing a first advertisement on a first device 130 of the devices 130 and when (e.g., at what point during the advertisement) a user who was watching the first advertisement on the first device 130 moves to a second device 130 that is not displaying an advertisement or to a third device 130 that is displaying a second advertisement to a different user(s).

Based on the point during the first advertisement that the user left the proximity of the first device 130 as detected by Step 201, Step 202 splits the first advertisement to be played on the second device 130 from the point the user left the viewing proximity of the first device 130.

Step 203 dynamically updates the optimization of the advertisements based on Step 201 identifying that the users viewing the particular device 130 has changed. Thus, as a user(s) enter and leave the proximity of a device 130, the next (subsequent) advertisement played on the device 130 with the new user(s) will be optimized by Step 201 based on the detected change in user(s) viewing the device 130.

Step 204 stops the device 130 from distributing an advertisement if Step 201 detects that there are no users in the proximity (e.g., close to) the device 130.

When Step 201 identifies that a user(s) has moved from a second device 130 playing a second advertisements to a first device 130 already playing a first advertisement to a user(s), Step 205 merges the first advertisement and the second advertisement using an in-advertisement dynamic personalization technique such that the two advertisements are merged to continue playing for the new set of users.

After Step 205 merges the advertisements together based on the group composition changing (e.g., more (less) users), Step 203 updates the advertisements based on the new group composition such that the most optimal advertisements are distributed to the users based on the new group composition in subsequent advertisements.

Exemplary Hardware Aspects, Using a Cloud Computing Environment

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 5, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

As shown in FIG. 5, computer system/server 12 in cloud computing node 10 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external circuits 14 such as a keyboard, a pointing circuit, a display 24, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Referring now to FIG. 6, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 6 are intended to be illustrative only and that computing nodes 10 and cloud computing environment 50 can communicate with any type of computerized circuit over any type of network and/or network addressable connection (e.g., using a web browser).

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the split and merge advertisement system 100 described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A split and merge advertisement system interfacing with a plurality of devices, each device including a user identifying unit configured to identify each user viewing advertisements on the respective device, the system comprising:
   a processor; and
   a memory, the memory storing instructions to cause the processor to perform:
      splitting a first advertisement when a moving user of a first group of users moves from a proximity of a first device to a proximity of the second device; and
      playing a remaining portion of the first advertisement on the second device when the splitting splits the first advertisement such that the first user views an entirety of the first advertisement.

2. A split and merge advertisement method interfacing with a plurality of devices, each device including a user identifying unit configured to identify each user viewing advertisements on the respective device, the method comprising:
   splitting a first advertisement when a moving user of a first group of users moves from a proximity of a first device to a proximity of the second device; and
   playing a remaining portion of the first advertisement on the second device when the splitting splits the first advertisement such that the first user views an entirety of the first advertisement.

3. A non-transitory computer-readable recording medium recording a split and merge advertisement program interfacing with a plurality of devices, each device including a user identifying unit configured to identify each user viewing advertisements on the respective device, the program causing a computer to perform:
   splitting a first advertisement when a moving user of a first group of users moves from a proximity of a first device to a proximity of the second device; and playing a remaining portion of the first advertisement on the second device when the splitting splits the first advertisement such that the first user views an entirety of the first advertisement.

4. The method of claim 2, further comprising optimizing a second advertisement to be played on the first device for the first group of users having a new group composition and a third advertisement to be played on the second device for the moving user.

5. The method of claim 2, further comprising playing a second advertisement on the first device after the splitting splits the first advertisement to the second device.

6. The method of claim 2, further comprising dynamically re-computing a personalization score of the first group of users when the playing plays the first advertisement on the second device.

* * * * *